United States Patent [19]
Tiefenthaler

[11] Patent Number: 4,952,056
[45] Date of Patent: Aug. 28, 1990

[54] METHOD OF DETERMINING THE AUTOCOLLIMATION ANGLE OF A GRATING COUPLER

[75] Inventor: Kurt Tiefenthaler, Zürich, Switzerland

[73] Assignee: Entwicklungsgemeinschaft ASI, Zürich, Switzerland

[21] Appl. No.: 347,752

[22] Filed: May 5, 1989

[30] Foreign Application Priority Data

May 17, 1988 [CH] Switzerland .................. 01845/88

[51] Int. Cl.$^5$ .................... G01N 21/84; G02B 6/34
[52] U.S. Cl. ............................ 356/73.1; 350/96.19
[58] Field of Search .................. 356/73.1; 350/96.19

[56] References Cited

PUBLICATIONS

Optics Letters, Band 8, Nr. 10, Oct. 1983, Optical Society of Amerika, W. Lukosz et al.: "Embossing technique for fabricating integrated optical components in hard inorganic waveguiding materials", pp. 537–539, see p. 538, right hand column, lines 4–9 discussed in the subject application.
Electronics Letters, Band 23, Nr. 7, 26 Mar., 1987, (Hitchin, Herts., GB), N. W. Carlson et al.: "Measuremenat of effective index and dispersion in an index-guided surface-emitting distributed Bragg reflector laser", pp. 355–357, see p. 355, right hand column lines 53–55.
Integrated Optics, 1973, IEEE Press (New York, US), M. L. Dakss et al.: "Grating coupler for efficient excitation of optical guided waves in thin films", pp. 144, 145.
JOSA Publication, vol. 6, No. 2/Feb. 1989, K. Tiefenthaler and W. Lukosz: "Sensitivity of grating couplers as integrated-optical chemical snesors".

Primary Examiner—Vincent P. McGraw
Attorney, Agent, or Firm—Werner W. Kleeman

[57] ABSTRACT

The method relates to determining the autocollimation angle of a grating coupler comprising a thin waveguiding film and a diffraction grating. A laser beam is approximately normally directed to the diffraction grating which is mounted at a turntable. The turntable is movable in positive and negative rotational directions through small angles of rotation by a lever arm which is engaged by a micrometer screw driven by a stepping motor until the incoupling condition is satisfied for excitation of a waveguiding mode in the forward and rearward propagation directions in the waveguiding film. The autocollimation angle is determined as the mean value of the two angles of incidence for resonance excitation of the waveguiding modes in the waveguiding film under the incoupling condition.

15 Claims, 1 Drawing Sheet

METHOD OF DETERMINING THE AUTOCOLLIMATION ANGLE OF A GRATING COUPLER

BACKGROUND OF THE INVENTION

The present invention relates to a new and improved method of determining the autocollimation angle of a grating coupler.

In its more particular aspects, the present invention specifically relates to a new and improved method of determining, with respect to a light beam, the autocollimation angle of a grating coupler comprising a waveguiding structure which defines predeterminate waveguiding modes in forward and rearward propagation directions, and a diffraction grating having a predeterminate grating period and defining predeterminate diffraction orders.

Grating couplers, prism couplers and endfire couplers are known technical means for exciting a waveguiding mode in a waveguide. When using a grating coupler or a prism coupler, the effective refractive index of a waveguiding mode can be determined by determining the associated incoupling angle. Such incoupling angle is defined as the difference between the angle of incidence for resonance excitation of the waveguiding mode and the autocollimation angle at which the light beam, for example, a laser beam, is reflected back on itself. In this manner, the angle of incidence can be determined very precisely because the excitation of the waveguide mode is based on a resonance phenomenon.

According to one hitherto known method of determining the autocollimation angle, the waveguide to be investigated is mounted on a turntable and a laser beam is directed normal or perpendicular to the surface of the waveguide to be investigated. The turntable is adjusted such that the laser beam is reflected back on itself as precisely as possible. This method, however, is afflicted with relatively wide tolerances. Also, the precise determination of the autocollimation angle is fraught with difficulties and requires an expensive optical autocollimation system.

SUMMARY OF THE INVENTION

Therefore with the foregoing in mind it is a primary object of the present invention to provide a new and improved method of determining the autocollimation angle of a grating coupler and which method does not suffer from the aforementioned drawbacks and shortcomings of the prior art.

Another and more specific object of the present invention is directed to a new and improved method of determining the autocollimation angle of a grating coupler and which method permits employing means which are as simple as possible and yet enable carrying out the determination of the autocollimation angle of a grating coupler in a manner as precise as possible.

Now in order to implement these and still further objects of the invention, which will become more readily apparent as the description proceeds, the method of the present development is manifested, among other things, by the features that, a light beam is directed to the diffraction grating of the grating coupler at different angles of incidence for exciting at least one waveguiding mode in the waveguiding structure. The waveguiding mode is excited in the forward propagation direction as well as in the associated rearward propagation direction and respective positive and negative diffraction orders are selected at the diffraction grating. There are thus determined the predetermined angles of incidence at which the at least one waveguiding mode is excited under resonance conditions in both the forward and rearward propagation directions at the selected diffraction orders. The autocollimation angles is, then, determined as the mean value of the predetermined angles of incidence associated with the resonance excitation of the at least one waveguiding mode in the waveguiding structure in the forward and rearward propagation directions.

When the autocollimation angle of the grating structure is known, it is possible to quantitatively determine the effective refractive index which is associated with the waveguiding mode, in the selected region of the diffraction grating.

Furthermore, and on the basis of the inventive method of determining the autocollimation angle of the waveguiding structure, it is possible to continuously and quantitatively determine the effective refractive index associated with the waveguiding mode, even if the waveguide is temporarily removed from the mounting means of, for example, a turntable at which the waveguide or waveguiding structure is mounted.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DETAILED DESCRIPTION OF THE PREFERRED EMBODIMENTS

Figure 1:
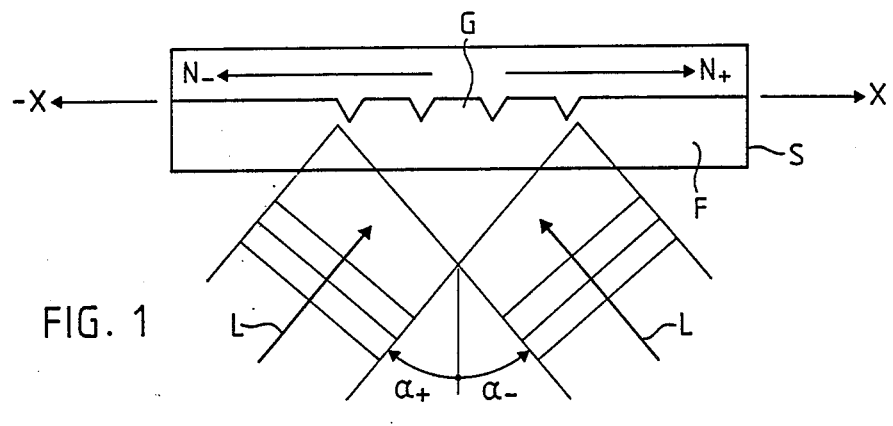
FIG. 1 is a schematic illustration of a grating coupler showing the forward and rearward propagation directions of a waveguiding mode and the associated angles of incidence.

Describing now the drawings, it is to be understood that to simplify the showing thereof, only enough of the installation for carrying out the inventive method has been illustrated therein as is needed to enable one skilled in the art to readily understand the underlying principles and concepts of this invention. Turning now specifically to FIG. 1 of the drawings, there has been illustrated therein by way of example and not limitation, a grating coupler comprising a waveguiding structure which basically contains a thin waveguiding film F on a substrate S and a diffraction grating G. A light beam, for example, a laser beam L is directed to the diffraction grating G and is incoupled into the waveguiding structure in the $(+x)$-direction, i.e. a waveguiding mode is excited in the waveguiding structure or film F in the forward propagation direction, if the following incoupling condition is satisfied:

$$N_+ \equiv +N = \sin \alpha_+ + 1_+(\lambda/\Lambda) \quad (1)$$

wherein:

N is the effective refractive index associated with the excited waveguiding mode;

$\alpha_+$ is the incoupling angle for exciting the waveguiding mode in the (+x)-direction or forward propagation direction;

$1_+$ is equal to $+|1|$ and designates the diffraction order;

$\lambda$ is the wavelength of the light or laser beam L; and $\Lambda$ is the grating period.

It is also possible to excite a waveguiding mode in the (−x)-direction, i.e. in the rearward propagation direction via the diffraction order $1_- = -|1|$, if the corresponding incoupling condition is satisfied:

$$N_- \equiv -N = \sin \alpha_- + 1_-(\lambda/\Lambda) \quad (2)$$

The elements in this equation (2) have a meaning which corresponds to the meaning of the analogous elements in equation (1); $\alpha_-$ is the incoupling angle for exciting the waveguiding mode in the (−x)-direction, i.e. the rearward propagation direction. For reasons of symmetry, the following equation is valid:

$$\alpha_- = -\alpha_+ \quad (3)$$

This equation has the precondition that the waveguiding modes which are excited in the forward and rearward propagation directions, are excited using the same diffraction order, i.e. $|1_+| = |1_-|$ The following equations are valid for the incoupling angles:

$$\alpha_+ = \alpha_{1+} - \alpha_{ac}, \quad \alpha_- = \alpha_{1-} - \alpha_{ac} \quad (4)$$

Therein, $\alpha_{1\pm}$ is the resonance angle of incidence for exciting the waveguiding mode in the forward and rearward propagation directions at the selected diffraction order $1_\pm$ and $\alpha_{ac}$ is the autocollimation angle. It follows thus from equation (4) that the autocollimation angle $\alpha_{ac}$ is the mean value of the two resonance angles of incidence, namely:

$$\alpha_{ac} = (\alpha_{1+} + \alpha_{1-})/2 \quad (5)$$

Since $\alpha_{1+}$ and $\alpha_{1-}$ constitute resonance angles of incidence, the autocollimation angle $\alpha_{ac}$ thus can be determined with the precision at which the resonance angles of incidence are determined. When the autocollimation angle has been determined, there can also be determined the effective refractive index which is associated with the waveguiding mode, on the basis of the incoupling condition, i.e. equation (1) or (2).

Figure 2:
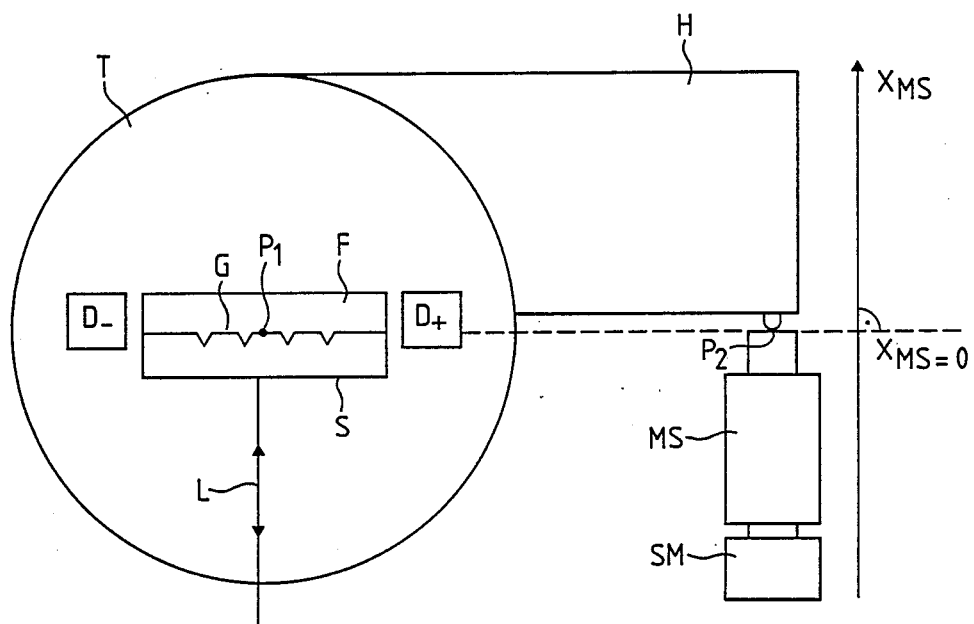
FIG. 2 is a schematic plan view of an installation for carrying out an exemplary embodiment of the inventive method and containing a turntable for mounting the grating coupler to be investigated and the drive means for high-resolution rotation of such turntable.

In an installation or apparatus for carrying out an exemplary embodiment of the inventive method of determining the autocollimation angle and which installation or apparatus is schematically illustrated in FIG. 2, the grating coupler is mounted at a turntable T. Such turntable T in practice is always afflicted with a certain imprecision. In order to minimize the effect of such imprecision, the difference between the resonance angles of incidence, namely $\alpha_+ - \alpha_- = 2\alpha_+$, should be maintained as small as possible. It is for this reason that the angle $\alpha_+$ should not be selected to be greater than 15°, preferably not greater than 9°.

Such selection of the incoupling angle $\alpha_+$ primarily can be accomplished by appropriately selecting the grating period which, in turn, is dependent upon the selected diffraction order. If, for example, $\alpha_+ = -\alpha_-$ is equal to 0, the effective refractive index is $N = |1|(\lambda/\Lambda)$. In this case, the grating period $\Lambda$ must be selected such that $\Lambda$ is equal to $|1|(\lambda/N)$.

When using $SiO_2-TiO_2$ waveguides having a refractive index of 1.8 and a film thickness of 120 nm, as described in the publication by W. Lukosz and K. Tiefenthaler in Optics Letters 8 (1983), pages 537 to 539, it is recommended to use the following grating periods.

For incoupling at the diffraction order $l=1$, the grating coupler advantageously has a line number of 2,400 lines/mm. However, there can also be used gratings having only 1,200 lines/mm. In such case, the incoupling will be effected by using the diffraction order $l=2$.

Figure 3:
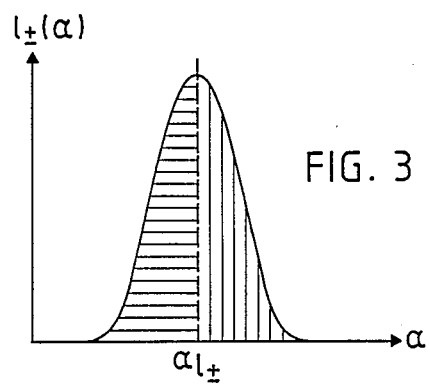
FIG. 3 is a graph showing the intensity distribution of an excited waveguiding mode as a function of the angle of rotation of the grating coupler through the angular region of the resonance angle of incidence.

The use of a small angle difference $\alpha_+ - \alpha_- = 2\alpha_+$ implies almost perpendicular incidence of the light or laser beam L for exciting the waveguiding mode. This has the advantage that the precise resonance angles of incidence $\alpha_{1+}$ and $\alpha_{1-}$ can be determined from resonance incoupling curves using the apparatus as illustrated in FIG. 2. In such apparatus, a pivotable lever arm H is connected with the turntable T and drivingly engaged with feed means MS constituted by, for example, a highest precision micrometer screw which, for instance, may be driven by means of a stepping motor SM. The feed means or micrometer screw MS thus acts upon the pivotable lever arm H to drive the turntable T in a very precise manner through an angular range including the aforementioned resonance angles of incidence. There can thus be recorded resonance incoupling curves of the general type as illustrated in FIG. 3 of the drawings. During such operation, the position of the measuring point $P_2$ at the feed means or micrometer screw MS can be determined, for example, by means of an encoder, preferably of optical design, which is mounted at the stepping motor SM and of conventional construction.

Since the lever arm-operated turntable or rotary apparatus T can only scan a very limited angular range or segment, due care must be taken that the two resonance angles of incidence $\alpha_{1+}$ and $\alpha_{1-}$ fall within this angular range or segment. For reasons of symmetry, there is advantageously selected the following experimental construction:

The autocollimation angle, i.e. the angular position at which the light or laser beam L is reflected back on itself, should at least approximately correspond to a position of the feed means or micrometer screw MS at which position the pivotable lever arm H extends substantially perpendicular to the axis, specifically lengthwise axis or feed axis of the micrometer screw MS, as also illustrated in FIG. 2. In other words, and more precisely, this means that the line which extends through the center of rotation or fulcrum $P_1$ of the turntable T and the engagement point $P_2$ of the pivotable lever arm H at the micrometer screw MS and which engagement point $P_2$ serves as the measuring point, extends substantially perpendicular to the axis, particularly lengthwise axis of the micrometer screw MS. Then, the engagement point or measuring point $P_2$ forms the zero point $X_{MS}=0$ on the $X_{MS}$-axis associated with the feed means or micrometer screw MS. This zero point $X_{MS}=0$ can be determined in the following simple manner using, as the grating coupler, a grating coupler which can be excited to at least the two fundamental modes $TE_0$ and $TM_0$:

The autocollimation angle is determined for the $TE_0$-mode as well as for the $TM_0$-mode so that there are determined the angles $\alpha_{ac}(TE)$ and $\alpha_{ac}(TM)$. By varying the position of the zero point $X_{MS}=0$ along the $X_{MS}$-axis, there can be detected a position in which:

$$\alpha_{ac}(TE)=\alpha_{ac}(TM) \qquad (6)$$

The thus obtained coordinate zero point $X_{MS}=0$ then satisfies the condition that the aforementioned line $\overline{P_1 P_2}$ extends substantially perpendicular to the $X_{MS}$- axis defined by the feed means or micrometer screw MS.

The aforementioned adjustment method generally can also be utilized for calibrating a turntable like the turntable T which is intended to be movable through a small angular range or segment at high resolution. In this case, the grating coupler is only employed for finding the position at which the pivotable lever arm H extends substantially perpendicular to the axis, particularly lengthwise axis of the feed means or micrometer screw MS.

In the case that the grating coupler is employed as a sensor, as described, for example, in the publication by K. Tiefenthaler and W. Lukosz, published in JOSA B6 (1989), pages 209 to 220, it is advantageous to select an experimental construction in which the grating coupler is substantially horizontally arranged, i.e. substantially parallel to a tabletop. Then, a liquid sample, for instance, in the form of a drop of a liquid can be directly applied to the grating coupler without the danger of running off therefrom. For reasons of space, it also recommended that the laser for generating the laser beam L and the feed means or micrometer screw MS are, also arranged substantially parallel to the tabletop. A vertical laser beam L is generated from the horizontal laser beam by means of a deflecting mirror and such vertical laser beam impinges substantially perpendicularly upon the grating coupler. During the entire measuring time period, the investigated drop of liquid cannot run off from the grating coupler because only small angular changes occur in the inventive measuring apparatus.

Advantageously, a linearly polarized laser is employed. When using such polarized laser, the light intensity or power which is coupled into a waveguiding mode of the waveguiding structure or grating coupler, can be varied by rotating the laser tube. Particularly, there can be accomplished that the intensity of light coupled into the $TE_0$-mode is substantially equal to the light intensity coupled into the $TM_0$-mode.

The aforementioned resonance incoupling curves are preferably recorded using the following technique. Photodiodes $D_+$ and $D_-$ are respectively mounted at the two opposite ends of the waveguiding structure or grating coupler or waveguiding film F as illustrated in FIG. 2. There can thus be measured the intensity of the light or laser light which is coupled into the waveguiding structure or grating coupler or waveguiding film F. Specifically, the photodiode $D_+$ responds to the intensity $i_+$ coupled into the waveguiding mode associated with the forward propagation direction or $(+x)$-direction and the photodiode $D_-$ responds to the intensity $i_-$ coupled into the waveguiding mode associated with the rearward propagation direction or $(-x)$-direction.

The thus detected mode intensity $i_\pm$ is dependent upon the angle $\alpha$ of incidence and proportional to the resonance incoupling curve $\eta_\pm(\alpha)$ and such resonance incoupling curve has a certain resonance width. Typical values for the resonance width lie in the range of 4 to 6 angular or arc minutes.

The angle $\alpha$ of incidence can be computed from the position $X_{MS}$ of the feed means or micrometer screw MS in the following manner:

If in zero position $X_{MS}=0$ the spacing, which exists between the center of rotation $P_1$ of the turntable T and the engagement point or measuring point $P_2$ of the pivotable lever arm H at the feed means or micrometer screw MS is equal to R, there results the following equation:

$$\alpha=\arctan(X_{MS}/R) \qquad (7)$$

The exact resonance angle of incidence $\alpha_{1+}$ or $\alpha_{1-}$ is computed by means of a mathematical algorithm from the resonance incoupling curve $\eta_\pm(\alpha)$. For example, the resonance angle of incidence $\alpha_{1\pm}$ is defined as the integral center of the resonance incoupling curve $\eta_\pm(\alpha)$, meaning that:

$$\int_{-\infty}^{\alpha_{1\pm}} \eta \pm (\alpha)\, d\alpha = \int_{\alpha_{1\pm}}^{+\infty} \eta \pm (\alpha)\, d\alpha \qquad (8)$$

This equation defines in unequivocable manner, the resonance angle of incidence $\alpha_{1\pm}$. FIG. 3 is a graphic representation of such resonance incoupling curve. According to the defining equation (8) as given hereinabove, the horizontally hatched area is substantially equal to the vertically hatched area of the resonance incoupling curve.

Advantageously, a background is considered in the aforementioned algorithm. In correspondence therewith, the aforenoted defining equation (8) for the resonance angle of incidence must be supplemented as follows:

$$\int_{-\infty}^{\alpha_{1\pm}} \eta' \pm (\alpha)\, d\alpha = \int_{\alpha_{1\pm}}^{+\infty} \eta' \pm (\alpha)\, d\alpha \qquad (9)$$
$$(\eta'\pm>0) \qquad (\eta'\pm>0)$$

Therein $\eta'_\pm = \eta_\pm - t\eta_{\pm max}$ and a typical value of t is $t=0.2$. The maximum of the resonance incoupling $\eta_\pm$ is designated by $\eta_{\pm max}$. Since the resonance incoupling curves have very small resonance widths, the aforenoted condition (9) can also be rewritten in $x_{MS}$ coordinates as follows:

$$\int_{-\infty}^{X_{1\pm}} \eta' \pm (X_{MS})\, dx_{MS} = \int_{X_{1\pm}}^{+\infty} \eta' \pm (X_{MS})\, d\, x_{MS} \qquad (10)$$
$$(\eta'\pm>0) \qquad (\eta'\pm>0)$$

Therein the resonance angle of incidence $\alpha_{1\pm}$ is given by the equation:

$$\alpha_{1\pm}=\arctan(X_{1\pm}/R) \qquad (11)$$

This method is of interest particularly if the position of the engagement point or measuring point $P_2$ associated with the feed means or micrometer screw MS is read by an encoder, preferably the aforementioned conventional optical encoder. For the determination of the effective refractive index associated with the excited waveguiding mode, this approximation causes only a negligible error in the range of $10^{-8}$ to $10^{-9}$.

Furthermore, the very precise determination of the autocollimation angle offers the possibility of continuously and quantitatively determining the effective refractive index associated with a waveguiding mode even if the waveguiding structure or grating coupler or waveguiding film F is dismounted from its retainer at the turntable T for some period of time.

While there are shown and described present preferred embodiments of the invention, it is to be distinctly understood that the invention is not limited thereto, but may be otherwise variously embodied and practiced within the scope of the following claims.

Accordingly, what I claim is:

1. A method of determining, with respect to a light beam, the autocollimation angle of a grating coupler comprising a waveguiding structure which defines predeterminate waveguiding modes in forward and rearward propagation directions, and a diffraction grating having a predeterminate grating period and defining predeterminate diffraction orders, comprising the steps of:
    directing the light beam to the diffraction grating at different angles of incidence and thereby exciting at least one waveguiding mode in said waveguiding structure;
    said step of exciting said at least one waveguiding mode in said waveguiding structure entailing the steps of exciting said at least one waveguiding mode in the forward propagation direction as well as in the associated rearward propagation direction and selecting respective positive and negative diffraction orders defined by said diffraction grating;
    determining predetermined angles of incidence at which said at least one waveguiding mode is excited under resonance conditions in both said forward and said rearward propagation directions at the selected diffraction orders; and
    determining, as said autocollimation angle, the mean value of the predetermined angles of incidence associated with the resonance excitation of said at least one waveguiding mode in said waveguiding structure in said forward and rearward propagation directions.

2. The method as defined in claim 1, further including the step of:
    determining an incoupling angle associated with said at least one waveguiding mode of said waveguiding structure, as the angle difference between said predetermined angle of incidence, at which said at least one waveguiding mode is excited in said waveguiding structure under resonance conditions, and said autocollimation angle.

3. The method as defined in claim 2, further including the step of:
    using, at a preselected diffraction order defined by said diffraction grating, as said diffraction grating a diffraction grating having a predetermined grating period which minimizes said incoupling angle for said resonance excitation of at least one waveguiding mode in said waveguiding structure.

4. The method as defined in claim 3, wherein:
    said incoupling angle is selected to have a value less than 15°.

5. The method as defined in claim 4, wherein:
    said incoupling angle is selected to have a value less than 9°.

6. The method as defined in claim 2, further including the step of:
    using, at a preselected grating period of said diffraction grating, as said respective positive and negative diffraction orders, predetermined diffraction orders which minimize said incoupling angle for said resonance excitation of said at least one waveguiding mode in said waveguiding structure.

7. The method as defined in claim 6, wherein:
    said incoupling angle is selected to have a value less than 15°.

8. The method as defined in claim 7, wherein:
    said incoupling angle is selected to have a value less than 9°.

9. The method as defined in claim 1, further including the steps of:
    mounting said grating coupler at a turntable;
    rotating said turntable relative to said light beam for directing said light beam to said diffraction grating under said different angles of incidence for determining said predetermined angles of incidence for resonance excitation of said at least one waveguiding mode in said waveguiding structure; and
    said step of rotating said turntable including the steps of pivoting a pivotable lever arm, which is connected to said turntable, and operating feed means engaging said pivotable lever arm for pivoting said pivotable lever arm and thereby rotating said turntable through a predeterminate angular range.

10. The method as defined in claim 9, further including the steps of:
    determining, as an incoupling angle, the angle difference between said predetermined angles of incidence at which said at least one waveguiding mode is excited in said waveguiding structure under resonance conditions, and said autocollimation angle;
    determining a feed axis defined by said feed means; and
    determining a predetermined feed displacement of said feed means along said feed axis from a predetermined zero point and thereby determining a predetermined rotary angle of said turntable which corresponds to said incoupling angle.

11. The method as defined in claim 10, wherein:
    said step of determining said predetermined feed displacement along said feed axis from said predetermined zero point entails determining the incoupled light intensity as a function of the feed displacement in order to thereby obtain a resonance incoupling curve; and
    determining the integral center of said resonance incoupling curve on said feed axis as said predetermined feed displacement.

12. The method as defined in claim 10, further including the steps of:
    calibrating said turntable;
    said calibrating operation entailing the steps of:
    determining at least two mean values of at least two predetermined angles of incidence associated with said resonance excitation of at least two different waveguiding moded in said waveguiding structure in said forward and rearward propagation directions; and
    positioning said predetermined zero point on said feed axis defined by said feed means in a position in which said at least two mean values are at least approximately equal and thereby positioning said pivotable lever arm, which is connected to said turntable, such as to extend substantially perpendicular to said feed axis defined as the lengthwise axis of said feed means.

13. The method as defined in claim 1, further including the step of:
generating said light beam by means of a polarized laser.

14. The method as defined in claim 1, further including the step of:
quantitatively determining at least one effective refractive index associated with said at least one waveguiding mode in at least one propagation direction in said waveguiding structure on the basis of the autocollimation angle and the incoupling equation:

$$N_\pm = \pm N = \sin \alpha_\pm + 1_\pm (\lambda/\Lambda)$$

wherein:
N is the effective refractive index associated with the waveguiding mode;
$\alpha_\pm$ is the incoupling angle for exciting the waveguiding mode in a predeterminate propagation direction;
$1_\pm$ is the diffraction order;
$\lambda$ is the wavelength of the light beam; and
$\Lambda$ is the grating period of the diffraction grating.

15. The method as defined in claim 12, wherein:
said step of calibrating said turntable further entails the step of using, as said grating coupler, a grating coupler excitable to at least the two fundamental waveguiding modes, for positioning said pivotable lever arm, which is connected to said turntable, such as to extend substantially perpendicular to said feed axis defined as said lengthwise axis of said feed means.

* * * * *